United States Patent
Horneman et al.

(10) Patent No.: US 9,572,193 B2
(45) Date of Patent: Feb. 14, 2017

(54) DEVICE-TO-DEVICE COMMUNICATION

(75) Inventors: Kari Veikko Horneman, Oulu (FI);
Vinh Van Phan, Oulu (FI); Ling Yu,
Oulu (FI)

(73) Assignee: Nokia Solutions and Networks Oy,
Espoo (FI)

( * ) Notice: Subject to any disclaimer, the term of this
patent is extended or adjusted under 35
U.S.C. 154(b) by 0 days.

(21) Appl. No.: 13/255,684

(22) PCT Filed: Mar. 12, 2009

(86) PCT No.: PCT/EP2009/052904
§ 371 (c)(1),
(2), (4) Date: Oct. 3, 2011

(87) PCT Pub. No.: WO2010/102668
PCT Pub. Date: Sep. 16, 2010

(65) Prior Publication Data
US 2012/0020213 A1    Jan. 26, 2012

(51) Int. Cl.
*H04W 76/04* (2009.01)
*H04W 72/04* (2009.01)
*H04W 28/02* (2009.01)
*H04W 76/00* (2009.01)
H04W 76/02 (2009.01)

(52) U.S. Cl.
CPC ....... *H04W 76/043* (2013.01); *H04W 28/0278*
(2013.01); *H04W 72/04* (2013.01); *H04W
72/0406* (2013.01); *H04W 76/023* (2013.01)

(58) Field of Classification Search
CPC ............... H04W 76/23; H04W 76/043; H04W
28/0278; H04W 72/04; H04W 72/0406;
H04W 76/023

USPC .......................................... 370/213, 328, 214
See application file for complete search history.

(56) References Cited

U.S. PATENT DOCUMENTS

| | | | | |
|---|---|---|---|---|
| 2003/0086393 | A1* | 5/2003 | Vasudevan et al. | 370/330 |
| 2003/0144003 | A1* | 7/2003 | Ranta et al. | 455/450 |
| 2005/0047335 | A1* | 3/2005 | Cheng et al. | 370/229 |
| 2007/0055862 | A1 | 3/2007 | Sharma et al. | |
| 2007/0064643 | A1* | 3/2007 | Tavares | 370/328 |
| 2008/0019320 | A1* | 1/2008 | Phan et al. | 370/331 |
| 2008/0186895 | A1* | 8/2008 | Shang et al. | 370/312 |
| 2009/0016301 | A1* | 1/2009 | Sammour et al. | 370/331 |
| 2009/0103478 | A1* | 4/2009 | Sammour et al. | 370/328 |

(Continued)

FOREIGN PATENT DOCUMENTS

| | | |
|---|---|---|
| CN | 1371583 A | 9/2002 |
| CN | 1404700 A | 3/2003 |

(Continued)

OTHER PUBLICATIONS

"Long Term Evolution Protocol Overview", Oct. 2008, freescale semiconductor, Rev. 0, 18 pages.*

(Continued)

*Primary Examiner* — Brian J Gillis
*Assistant Examiner* — Amy Ling
(74) *Attorney, Agent, or Firm* — Harrington & Smith

(57) ABSTRACT

There is provided a solution for improving the quality of service of end-to-end communication between at least two user terminals. The solution includes applying uplink signaling in which information related to the traffic status of a direct device-to-device communication link is transmitted.

26 Claims, 3 Drawing Sheets

(56) References Cited

U.S. PATENT DOCUMENTS

| | | | |
|---|---|---|---|
| 2010/0003982 A1* | 1/2010 | Somasundaram et al. | 455/436 |
| 2010/0070814 A1* | 3/2010 | Damnjanovic et al. | 714/748 |
| 2011/0117907 A1* | 5/2011 | Hooli et al. | 455/422.1 |
| 2011/0194485 A1* | 8/2011 | Horneman et al. | 370/315 |
| 2011/0201374 A1* | 8/2011 | Periyalwar | H04W 52/383 |
| | | | 455/517 |
| 2012/0106517 A1* | 5/2012 | Charbit et al. | 370/336 |
| 2014/0071950 A1* | 3/2014 | Jang | H04W 36/30 |
| | | | 370/331 |

FOREIGN PATENT DOCUMENTS

| | | |
|---|---|---|
| CN | 1521967 A | 8/2004 |
| CN | 1809037 A | 7/2006 |
| CN | 101051967 A | 10/2007 |
| WO | WO 01/62026 A1 | 8/2001 |

OTHER PUBLICATIONS

Forsberg, "Enhancing Security and Privacy in 3GPP E-UTRAN Radio Interface", Nov. 22, 2008, IEEE, PIMR'07, 5 pages.*

Klaus Doppler, Ming Xiao, et al., "Innovative Concepts in Peer-to-Peer and Network Coding", Jan. 16, 2009, Wireless World Initiative New Radio, 25 pgs.

3GPP TS 36.323 V8.4.0, "3rd Generation Partnership Project; Technical Specification Group Radio Access Network; Evolved Universal Terrestrial Radio Access (E-UTRA); Packet Data Convergence Protocol (PDCP) specification (Release 8)", Dec. 2008, 19 pages.

* cited by examiner

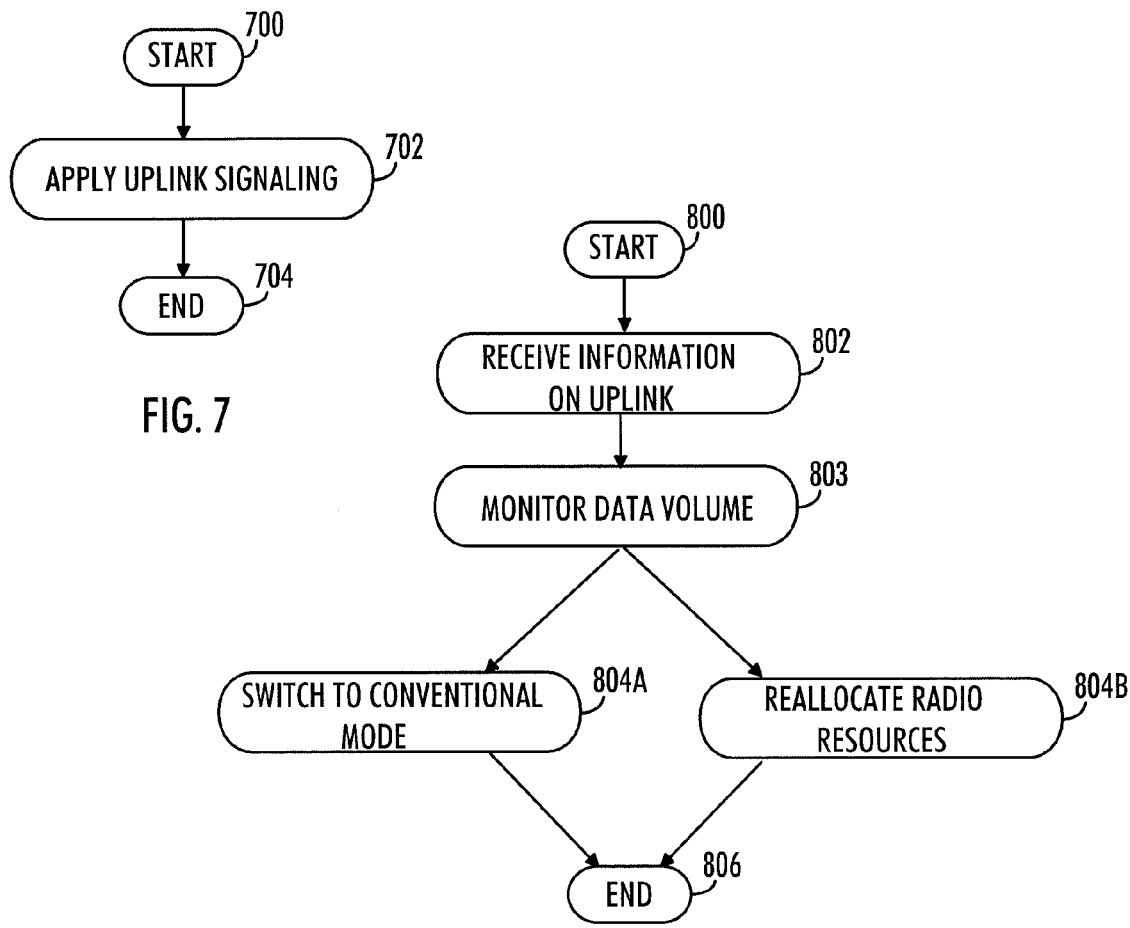
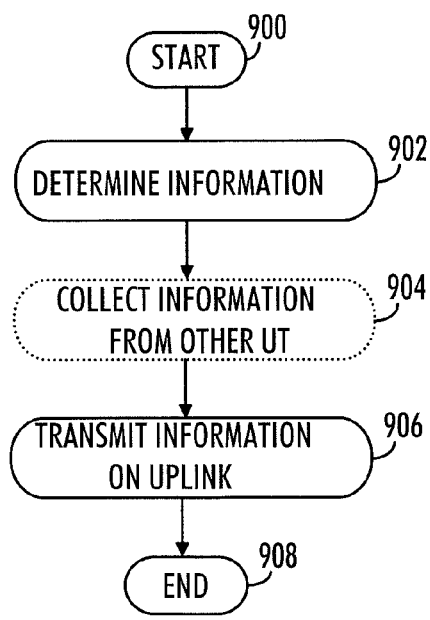
FIG. 7
FIG. 8
FIG. 9

DEVICE-TO-DEVICE COMMUNICATION

FIELD

The invention relates generally to mobile communication networks. More particularly, the invention relates to device-to-device communication in a communication network.

BACKGROUND

Generally, in a mobile communication network, such as the Long Term Evolution (LTE) or the LTE-Advanced (LTE-A) of the 3$^{rd}$ Generation Partnership Project (3GPP), two user terminals communicate with each other via a base station (evolved Node B (eNB) in the LTE). However, the requirements for efficient use of network resources and the needs for new services or service models may lead to applying direct device-to-device (D2D) communication. The D2D communication, or mobile-to-mobile, terminal-to-terminal, or peer-to-peer communication may be employed within the mobile communication network.

The direct D2D communication comprises at least two relatively closely located devices communicating with each other directly instead of a conventional communication link for end-to-end (E2E) communication, in which the source device transmits data to the destination device via the eNB. The two devices in the D2D communication may apply radio resources of the mobile communication network, thus sharing the resources with devices that are communicating with the eNB in the conventional link. This may lead to challenges in the radio resource allocation performed by the eNB. Further, the quality of service (QoS) of the E2E communication may suffer from the decisions related the radio resource allocation, a data transport method (the D2D communication link versus the conventional link), and the like, governed by the eNB.

Consequently, for the sake of performing reliable D2D communication, reducing transmitter power, increasing the capacity and coverage of the network, and creating and supporting services for the users, it is important to provide a solution for more efficient use of the D2D communication in a mobile communication network.

BRIEF DESCRIPTION OF THE INVENTION

An object of the invention is to provide a solution for more efficient use of direct device-to-device communication.

According to an aspect of the invention, there is provided a method as specified herein to perform example embodiments of the invention.

According to an aspect of the invention, there are provided apparatuses as specified herein to perform example embodiments of the invention.

According to an aspect of the invention, there is provided a computer program product as specified herein to perform example embodiments of the invention.

Further example embodiments of the invention are defined in the dependent claims.

LIST OF DRAWINGS

In the following, the invention will be described in greater detail with reference to the embodiments and the accompanying drawings, in which FIG. 1 presents a communication network according to an embodiment;

FIG. 2 presents a communication network employing a direct communication link according to an embodiment;

FIG. 7 illustrates a method for applying uplink signaling according to an embodiment;

FIG. 8 presents a method for controlling the quality of service of the communication, according to an embodiment; and FIG. 9 presents a method for transmitting the uplink signaling according to an embodiment.

DESCRIPTION OF EMBODIMENTS

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments. Although this invention is described using LTE (or Evolved universal mobile telecommunications system (UMTS) terrestrial radio access network (UTRAN) as a basis, it could be applicable to any other wireless mobile communication systems as well. For example, the embodiments may be applied under the UMTS or the Global system for mobile communications (GSM), etc. The telecommunication system may have a fixed infrastructure providing wireless services to subscriber terminals.

Figure 1:
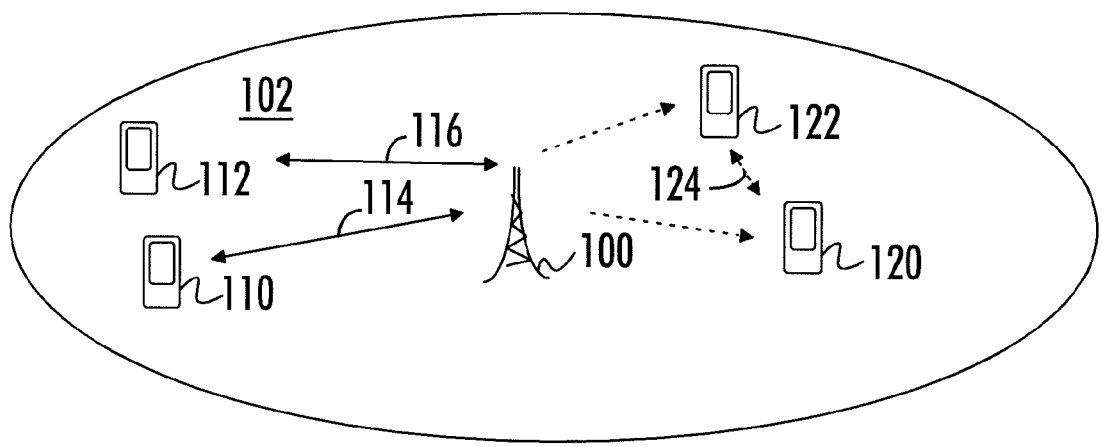

FIG. 1 illustrates possible methods for communication in a mobile communication network. The communication network may comprise a base station 100. The base station 100 may provide radio coverage to a cell 102, control radio resource allocation within the cell 102, perform data and control signaling, etc. The cell 102 may be a macro cell, a micro cell, or any other type of cell where radio coverage is present. Further, the cell 102 may be of any size or form depending on the antenna aperture. That is, it may not be of oval or circular form, but any other form is applicable to embodiments. The cell 102 controlled by the base station 100 may be divided into sectors, but such a scenario is not illustrated in greater detail in order to keep the focus on the invention.

The base station 100 may be used by multiple network operators in order to provide radio coverage from multiple operators to the cell 100. The base station 100 may be a node B, an evolved node B (eNB) as in LTE-A, a radio network controller (RNC), or any other apparatus capable of controlling radio communication within the cell 102. In the case of multiple base stations in the communication network, the base stations may be connected to each other with an X2 interface and via S1 interface to an evolved packet core (EPC), more specifically to a mobility management entity (MME) and to a serving gateway (S-GW). The MME controls the functions of non-access stratum signaling, roaming, authentication, tracking area list management, etc., whereas the S-GW handles functions including packet routing and forwarding, E-UTRAN idle mode packet buffering, etc.

Referring to FIG. 1, the cell 102 is associated with the base station 100 controlling communications within the cell 102. The base station 100 may control a cellular radio communication link established between the base station 100 and terminal devices 110 to 112 located within the cell 102. As explained in the background section, a conventional communication link for end-to-end communication is such where the source device transmits data to the destination device via the base station 100. That is, radio communication links 114 and 116 are established between the terminal device 110 and the base station 100, and between the terminal device 112 and the base station 100, respectively. Therefore, the user terminals 110, 112 may communicate with each other via the base station 100.

According to an embodiment, direct device-to-device (D2D) connections may be established among terminal devices. Direct communication links between two devices are established, e.g., between terminal devices 120 and 122 in FIG. 1. A direct communication link 124 may be based on any radio technology such that the terminal devices 120 and 122 involved in the direct communication may apply communication according to any of a plurality of radio access technologies.

According to an embodiment, the base station 100 may be responsible for controlling the direct communication link 124, as shown with dashed, bi-directional lines in FIG. 1. The radio access technology of the direct communication link 124 may operate on the same frequency band as the conventional communication link and/or outside those frequency bands to provide the arrangement with flexibility. Thus, the base station 100 may be responsible for allocating radio resources to the direct communication link 124 as well as for the conventional communication links 114 and 116. For example, the cellular network may operate in FDD duplex mode and the direct communication link 124 may apply TDD duplex mode utilizing uplink, downlink or uplink and downlink radio resources of the cellular network under the control of the base station 124.

Figure 2:
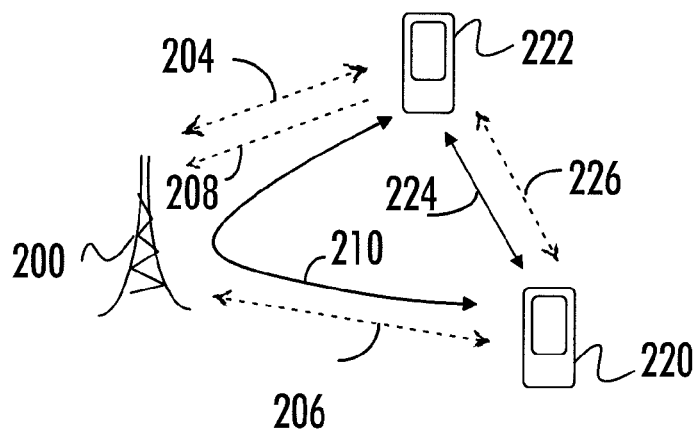

FIG. 2 shows a mobile communication network according to an embodiment. The network comprises a base station 200 and two user terminals 220 and 222. The user terminal 220, 222 may be a palm computer, user equipment or any other apparatus capable of operating in a mobile communication network. Even though the user terminals 220, 222 could apply conventional communication via the base station 200, they can communicate directly with each other via a D2D direct communication link 224. According to an embodiment, the two user terminals 220, 222 are the terminating points of the communication. The direct communication link may be utilized during a service or a call, for example.

The direct communication link 224 may be established by the base station 200 that provides radio coverage to the cell in which the user terminals 220, 222 are located. That is, the base station 200 may establish the connection 224 by controlling the operations of the user terminals 220, 222 via bi-directional control channels 204 and 206, as shown in FIG. 2. Further, the base station may be responsible for radio bearer control of the cellular network. The radio bearer is used to carry data with a certain QoS requirements, for example for a certain application. The user terminals 220, 222 may be in RRC connected state and, therefore, connected to the base station at least for control purposes via the control links 204, 206.

In order to facilitate efficient resource allocation and to provide adequate E2E QoS to the UEs utilizing possible direct D2D communications during the service or call, there is a need for the base station to know about the traffic demand, status and performance of the direct D2D communication link. In addition, sufficient monitoring of the D2D connection is desirable for fair charging and possible legal issues in public networks which require having a mechanism in place to monitor active users. Because the direct communication mode considered herein is meant for E2E communications where the two user terminals are the terminating points of the data communication, the base station may not be able to monitor the actual status and traffic performance over the D2D connection directly but rely on reporting from the involved UEs. Thus, according to an embodiment, the base station relies on reports obtained from the at least one user terminal in order to monitor the D2D communication link.

According to an embodiment, at least one user terminal 220, 222 and the base station 200 apply uplink signaling 208 in the mobile communication, wherein the signaling comprises information related to the traffic status of the direct communication link 224 between two user terminals 220, 222. That is, the information may be related to how actively and how well the communication link 224 is applied in communication of data packets between the user terminals 220, 222.

In addition, the information may be further related to functionalities of the radio-interface data link layer (layer 2) or above of at least one user terminal 220, 222 involved in the direct communication link 224. That is, at least one of the user terminals 220, 222 informs the base station via the uplink 208 about the status of the layer 2 or above. The layer 2, in the radio interface of a radio access network, such as UTRAN or E-UTRAN, often consists of a medium access control (MAC) sub-layer and a radio link control (RLC) sub-layer on top of MAC. In addition, a packet data convergence protocol (PDCP) on top of RLC may be considered as a sub-layer of the layer 2 as well. The layer 2 is responsible for in-order, reliable and secured data-packet transfer between peer-to-peer network entities. The layer 2 may adopt retransmission mechanisms, such as automatic repeat request (ARQ) and/or hybrid automatic repeat request (HARQ) protocols for detecting and correcting or recovering residual packet errors that may occur in the physical layer or that may be left by the physical layer. The information related to the layer 2 may thus comprise knowledge regarding the successfulness of the data transfer as well as the status of the transmitter/receiver data buffers on the radio bearer basis. In other words, the information transmitted in the uplink 208 may, according to an embodiment, comprise information to be monitored on the layer 2 of the connection between the two user terminals 220 and 222.

The information may comprise at least one of the following: transmitter buffer status, sequence number of the last arrived data packet, sequence number of the last transmitted data packet, sequence number of the last in-sequence received data packet, sequence numbers of at least one out-of-sequence received data packet and sequence numbers of at least one missing data packet, on the radio bearer basis of the user terminals. The data packet may correspond to a packet data convergence protocol (PDCP) packet. According to an embodiment, these items may be comprised in the transmitted information in any possible combination. That is, the information may comprise, for example, one, three or all of these items.

The transmitter buffer status may denote the status of the buffer of either the user terminal 220 or the user terminal 222, or the buffers of both of the user terminals 220 and 222. For example, the total amount of data found in the buffer may be reported to the base station 200. The buffer may be used to store data packets to be transmitted via the direct communication link 224 on the radio bearer basis.

Figure 5:
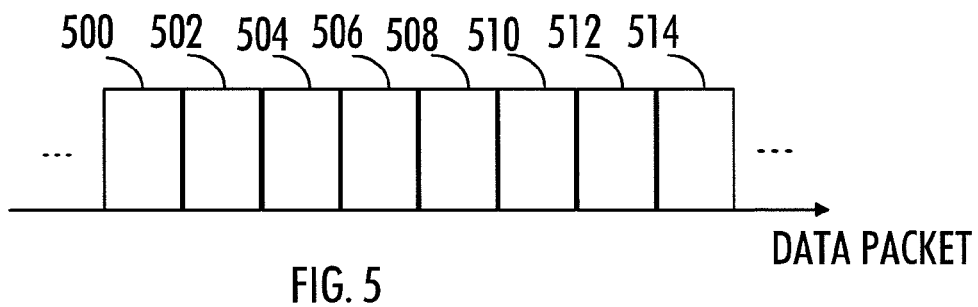
FIG. 5 illustrates use of sequence numbers according to an embodiment.

FIG. 5 illustrates exemplary use of sequence numbers. The data packets that are transmitted to the other end of the direct communication link may be identified with the sequence numbers 500 to 514 at the transmitter. Then, the receiver of the data packet may extract the sequence number 500 to 514 from the received data packet. Further, the transmitter may inform the receiver about the total number of data packets that are to be transmitted (instead of the total amount of data volume as for the buffer status in case data packets have preconfigured equal sizes). The sequence numbers 500 to 514 may thus be used in determining if all of the data packets have been received. Further, the sequence numbers 500 to 514 may be applied in determining the last in-sequence received data packet. In-sequence denotes that the sequence number of the received data packet follows the pattern of the previously received data packets. For example, in the case when the received sequence numbers are 1, 2, 3, 8 and 4, the last in-sequence received data packet is the data packet identified with the sequence number 4 (the received data packets are re-ordered in the receiver). Further, the sequence numbers of the at least one out-of-sequence received data packet are, in this case, the sequence number 8. The at least one missing data packet is, in this case, the data packets identified with sequence numbers 5, 6 and 7.

Let us take another look at FIG. 2. According to an embodiment, a user terminal 222 determines the information and transmits the information in the uplink 208. That is, the user terminal 222 transmits the information related to the traffic status of the direct communication link 224 concerning both the user terminals 220 and 222 on the radio bearer basis via the uplink 208. The user terminal 222 may transmit the information in the uplink on the MAC layer or above, including the option of using radio resource control (RRC) signaling.

According to an embodiment, the user terminal 222 may be configured to transmit the information in uplink periodically. That is, after a predetermined time the user terminal 222 transmits the information to the base station. Further, the transmission of information may occur after a predefined event, as the user terminal is configured or requested. For example, if the transmitter buffer reaches a predetermined level, the user terminal 222 may be triggered to transmit the information to the base station 200 via 208. The user terminal may also gather the information and transmit it to the base station upon receiving a request from the base station. In addition, the transmission of information may occur periodically after some predefined or specified event has occurred. The period for transmission may be adaptively varied during the communication.

According to an embodiment, the user terminal 222 may collect the information from the other user terminal 220 involved in the direct communication link. The user terminal 222 may request the user terminal 220 to transmit the information to the user terminal 222 via a link 226. Alternatively, the information may be transmitted from the user terminal 220 to the user terminal 222 via the direct communication link 224 already established.

Further, the user terminal 222 may then transmit the collected information in the uplink. The user terminal 222 may then transmit the collected information together with the information gathered by itself, that is from its own layer 2, from its own sequence number information, from its own transmitter buffer, and the like.

That is, both of the user terminals 220, 222 of the direct communication link 224 may determine the information. However, the information may be transmitted in the uplink to the base station by only one of the user terminals 220, 222 of the direct communication link 224.

Figure 3:
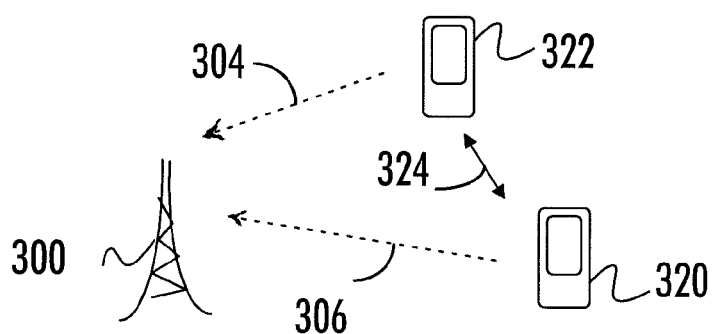
FIG. 3 shows a communication network employing a direct communication link according to an embodiment.

However, as shown in FIG. 3, according to another embodiment, both of the user terminals 320 and 322 involved in the direct communication link 324 may transmit the information to the base station 300 in the uplink via uplink channels 304 and 306, respectively. That is, the transfer of the information between the user terminals 320, 322 may not take place, because both user terminals 320, 322 transmit the information directly to the base station.

According to an embodiment, the transmission of the information from more than one user terminal involved in the direct communication may take place simultaneously in a synchronized manner, as configured and controlled. According to another embodiment, the transmission of the information from one user terminal may take place at a predefined time offset compared to another user terminal. For example, the user terminal 320 may transmit the information with a predetermined time offset compared to the user terminal 322.

By transmitting the information related to the traffic status of the direct communication link on the radio bearer basis in the uplink, the receiving base station may obtain knowledge it can apply in controlling the resource allocation and quality of service of end-to-end communication between the two user terminals. This controlling also includes possible switching back and forth between the supported radio-connectivity-and-operation modes of using a conventional cellular link via the base station or using direct D2D communication link, or using both. The end-to-end communication denotes the communication between two user terminals on a certain application level, either directly between the two user terminals or via the base station in the conventional communication method.

By transmitting the information related to the traffic status of the direct communication link on the radio bearer basis in the uplink, the receiving base station may obtain knowledge on the data volume of ongoing device-to-device communication and report the data volume to core network for e.g. charging purpose.

Looking back to FIG. 2, according to an embodiment, the base station 200 receives the information on the MAC layer or above including the option of using radio resource control (RRC) signaling. The information may be related to the traffic status of the direct communication link 224 between the two user terminals 220, 222, and further related to the functionalities of the layer 2 of at least one of the two user terminals 220, 222 involved in the direct communication link 224.

According to an embodiment, the base station configures and controls the user terminal monitoring and uplink signaling reports from the at least one user terminal 220, 222. Consequently, the base station 200 receives the uplink signaling from the at least one UE. The base station 200 may receive information periodically or in an event-triggered fashion. The event that triggers the transmission of information can be determined beforehand in the configuration of the mobile communication network. An exemplary event could be a fulfillment of the transmitter buffer up to a certain threshold. Further, the base station 200 may request either of the user terminals 220, 222 to transmit the information at any point of the communication.

Further, the base station 200 controls the user terminal reporting such that it receives the information from one user terminal only, or from more than one user terminal 220, 222. In a case the base station 200 receives the information from both of the user terminals 220, 222, the base station 200 may control the reporting such that the base station 200 receives the information simultaneously from both user terminals 220, 222, or first from one user terminal and, after a time offset delay, from the other user terminal. According to the embodiment, the base station 200 obtains knowledge of the traffic status on the ongoing direct communication link 224 between the two user terminals 220, 222, on the basis of the received information in the uplink channel 208. Further, the base station 200 may determine the D2D communication link performance including the progress of the corresponding radio bearers: their current data buffer status, up-to-date packet losses, and so forth.

The base station 200 may then be able to control the quality of service (QoS) of the end-to-end communication between the two user terminals 220, 222 on the basis of the received information. In other words, the base station 200 may, during a service or a call, control switching back and forth between the two modes: either using conventional links 210 for communication via the base station, using D2D communication links 224 without routing data through the base station 200, or using both of these modes simultaneously. This can be considered as a part of user terminal connection management and QoS control. Further, the base station is responsible for setting up, configuring and reconfiguring corresponding radio bearer(s) for each mode. The base station may also be responsible for controlling and scheduling data transmissions of each radio bearer to provide required QoS. Namely, the end-to-end communication does not denote simply the direct communication link 224, but also the conventional communication link 210 via the base station 200. The QoS denotes that the user terminals involved in the communication can employ sufficient resources in order to keep the communication reliable and free of unnecessary delays. Further, it denotes the ability to provide different priorities to different data flows, and to guarantee a certain level of performance to any data flow. For example, a required bit rate and packet dropping probability and/or bit error rate may be kept within certain predetermined limits.

According to an embodiment, the base station 200 may redistribute radio resources of the mobile communication on the basis of the received information. For example, the base station 200 may temporarily allocate more resources to the direct communication link 224 if the information received implies that the level of the traffic is high in the direct communication link 224 or there are more than a certain threshold number of missing packets in the communication between the two user terminals 220, 222.

It can be understood that at the establishment of the direct communication link 224, the base station has allocated a certain number of radio resources to the link 224, that is a certain number of radio resources that the user terminals 220, 222 involved in the direct communication link may use. The radio resources may be allocated in a frequency, time, spatial and/or code domain. That is, the communication link 224 may apply a certain frequency range, a certain time frame, a certain spatial orientation, or a certain code to distinguish the direct communication link 224 from other communications taking place in the vicinity of the direct communication link 224. Thus, after receiving a report of information in the uplink 208, the base station 200 may reallocate the radio resources such that sufficient quality of service is ensured for the direct communication link 224. For example, the base station 200 may allocate more resources to the direct communication link 224 if the traffic situation on the link requires more resources. If the traffic situation in the link 224 is lower than current radio resources would allow, the base station 200 may release some of the resources allocated to the link 224 such that they can be allocated to different communication links within the cell in which the base station 200 provides radio coverage. Alternatively, the base station 200 may decide that no redistribution of radio resources is needed at this point if the traffic situation and quality of the direct communication link is such that the number of radio resources allocated to the link 224 is of appropriate amount.

According to an embodiment, the base station 200 may decide whether to apply the conventional radio communication link 210 via the base station 200 or the direct communication link 224 between the two user terminals 220, 224 or not, on the basis of the received information. That is, the base station 200 may make the decision on the basis of the received traffic status and layer 2 information. For example, if the information implies that the traffic between the user terminals 220, 222 is such that the packet error rate or the like is above a predefined threshold, the direct communication link 224 may be stopped and the communication connection is switched to use the conventional communication link 210 via the base station 200, on the radio bearer basis. This is also referred to as mode switching or mode reselection between the direct mode and the conventional mode.

The base station 200 may further apply information related to the condition of the link 224 in making the decision whether to apply the conventional radio communication via the base station 200 or the direct communication between the two user terminals 220, 224 or not, or whether to redistribute the radio resources. That is, the invention does not exclude the use of information related to link 224 quality metrics, such as time/frequency variance, a signal-to-noise ratio (SNR), etc, in addition to the information related to at least one of the following: the traffic status, the data flow and the layer 2.

Figure 4:
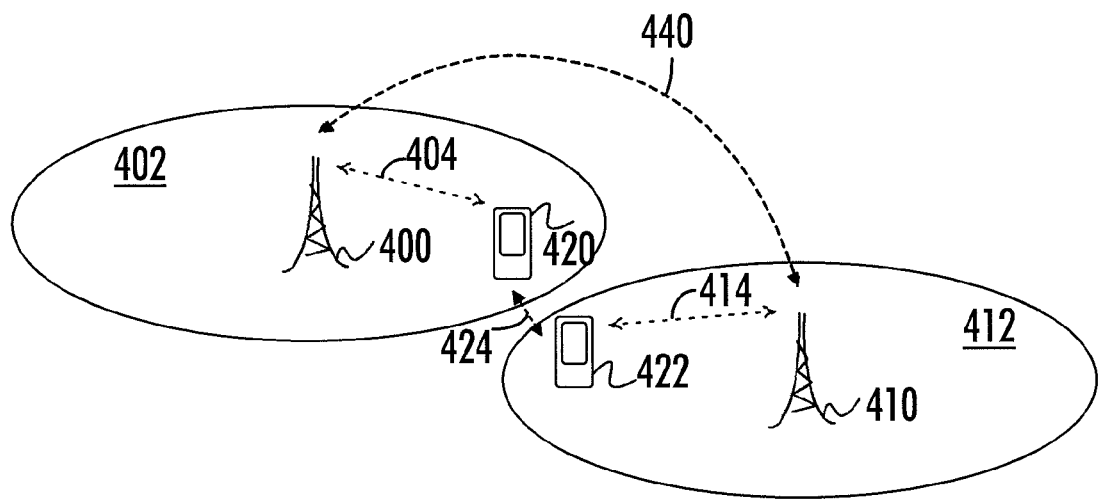
FIG. 4 illustrates a communication network employing a direct communication link according to an embodiment.

In an embodiment, as shown in FIG. 4, one 420 of the two user terminals 420, 422 is located in a radio coverage area 402 of a base station 400 and the other 422 of the two user terminals 420, 422 is located in a radio coverage area 412 of a different base station 410. Regardless of this, the user terminals 420, 422 may apply a direct communication link 424. However, in this case the quality of service of the communication between the two user terminals 420, 422 may be controlled by more than one base station. For example, the link 424 may be controlled by two base stations 400, 410, as shown with dotted lines 404 and 414, respectively.

In order to coordinate the control performed by the base stations 400, 410, the base stations 400, 410 may communicate with each other. That is, according to an embodiment, a base station 400 communicates with at least one other base station 410 in order to coordinate the quality of service of the end-to-end communication between the at least two terminals 420, 422. The base station 400 may communicate with base station 410 via, for example, the X2 interface 440 of the LTE. The base stations 400, 410 may keep each other updated of the layer 2 status information of the direct communication link 424, such as the packet data convergence protocol (PDCP) level report on the radio bearer basis received from at least one user terminal 420, 422. Here the base stations 400, 410 may control the QoS of the communication between the user terminals 420 and 422 by redistributing radio resources within the two cells 402 and 412, or by performing mode switching from the direct mode to the conventional mode.

According to an embodiment, the controlling base station may be involved in performing conventional handover for a user terminal involved in the direct communication link from one cell to another cell, in addition to controlling the QoS of the communication between the at least two terminals.

According to an embodiment, FIG. 5 can be seen to comprise data packets in one radio bearer. That is, the radio bearer shown in FIG. 5 may comprise data packets identified with sequence numbers 500 to 514. A different number of sequence numbers may be applied by another radio bearer. The radio bearer is used to carry certain type of data from a transmitter to a receiver. A certain radio bearer may require certain quality of service. The at least one user terminal may communicate the information related to the traffic status of the direct communication link between at least two terminals on the radio bearer basis. That is, the user terminal transmitting the information in the uplink may transmit the information for each radio bearer. For example, the user terminal may transmit the sequence number of the last in-sequence received data packet in a radio bearer. Then the receiving base station may control the QoS of the end-to-end communication in a radio bearer specific manner.

Figure 6:
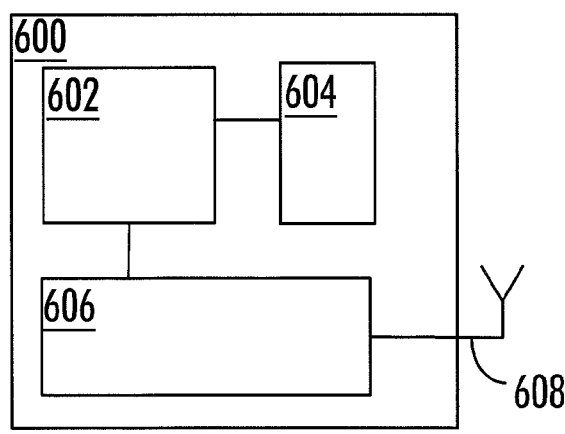
FIG. 6 shows a block diagram of an apparatus according to an embodiment.

A very general architecture of an apparatus according to an embodiment of the invention is shown in FIG. 6. FIG. 6 shows only the elements and functional entities required for understanding the apparatus according to an embodiment of the invention. Other components have been omitted for reasons of simplicity. The implementation of the elements and functional entities may vary from those shown in FIG. 6. The connections shown in FIG. 6 are logical connections, and the actual physical connections may be different. It is apparent to a person skilled in the art that the apparatus for applying the uplink signaling may also comprise other functions and structures.

According to an embodiment, the apparatus 600 is comprised in a user terminal of a mobile communication network. According to another embodiment, the apparatus 600 is comprised in a base station of a mobile communication network.

The apparatus 600 for applying the uplink signaling may comprise a processor 602. The processor 602 may be implemented with a separate digital signal processor provided with suitable software embedded on a computer readable medium, or with a separate logic circuit, such as an application specific integrated circuit (ASIC). The processor 602 may comprise an interface, such as computer port, for providing communication capabilities.

The processor 602 may be configured to apply uplink signaling to mobile communication, wherein the signaling comprises information related to the traffic status of a direct communication link between at least two terminals. Further the signaling may be related to functionalities of the layer 2 of at least one user terminal involved in the direct communication link.

Further, according to an embodiment, the processor 602 is applicable to a user terminal involved in a direct communication link between at least two terminals. Then, the processor 602 may determine the information related to the traffic situation and layer 2, and transmit the information in the uplink.

The apparatus 602, applicable to a user terminal, may be configured to manage a cache buffer beside the conventional layer 2 transmission-and-reception buffers in order to re-transmit at least one data packet already transmitted, as configured or if requested. The cache buffer is designed for monitoring the contents of direct in-band D2D communication, if desired. The buffer may be stored in a memory 604. The memory 604 may be connected to the processor 602. However, memory may also be integrated to the processor 602 and, thus, the memory 604 may not be required. The buffer may comprise one or more data packets transmitted previously via the direct communication link, and the apparatus 602 may be requested to re-transmit one or more data packets to the base station or to the other user terminal involved in the direct communication link. The data packets requested to be re-transmitted may be, for example, missing data packets.

Further, according to an embodiment, the processor 602 is applicable to a base station. Then, the processor 602 may control the quality of service of end-to-end communication between the at least two terminals on the basis of the received information. Further, the apparatus 602 may manage a virtual radio bearer database corresponding to the actual radio bearers applied to the direct communication between the at least two terminals. In addition, the apparatus may update the virtual radio bearer database on the basis of the received information related to the traffic status and the MAC layer. The virtual radio bearer database may be used when the mode switching from the direct communication mode to the conventional communication mode takes place. The apparatus 600 may store the virtual database in the memory 604, or store it directly in the processor 602.

Further, when the processor 602 is applicable to a base station, the processor 602 may be in control of the cache buffer that is present in the user terminal beside the conventional layer 2 transmission-and-reception buffers in order to re-transmit at least one data packet already transmitted, as configured or if requested. The processor 602 may control for example the configuration and operation of the buffer. The processor 602 may, for example, configure the size of the buffer, different window sizes and/or timers to manage the buffer (e.g. to empty the buffer).

Further the processor 602 may give commands to the user terminal storing the buffer to send any packets in the buffer to the apparatus 600 in order to perform monitoring of the data traffic or re-transmissions via the conventional communication method. According to an embodiment, the apparatus 600 controls re-transmissions of the direct communication link between the two user terminals such that the re-transmissions are performed through the conventional radio communication via the apparatus 600. According to another embodiment, the apparatus controls the re-transmission in the direct communication link if such re-transmissions directly between the two user terminals are needed. According to another embodiment, the apparatus 600 controls RLC (Radio Layer Control) layer re-transmissions of the direct communication link between the two user terminals such that the RLC (Radio Layer Control) layer re-transmissions are performed through the conventional radio communication via the apparatus 600.

The apparatus 600 may further comprise a transceiver (TRX) 606. The TRX 606 may further be connected to an antenna 608 enabling connection to and from an air interface. Alternatively, the antenna 608 may be connected to a wired interface. The TRX 606 may enable transmission and/or reception of information.

FIG. 7 shows a method for applying the uplink signaling. The method begins in step 700. In step 702 the method comprises applying the uplink signaling, in which information related to the traffic status of the direct communication link between at least two terminals is transmitted from a user terminal involved in the direct communication link to the base station. The method ends in step 704.

FIG. 8 illustrates a method for controlling the quality of service of the end-to-end communication between the at least two terminals at the base station. The method begins in step 800. In step 802, the base station receives the uplink signaling information related to the traffic status of the direct communication link. In step 803, the base station monitors data volume of ongoing end-to-end communication between at least two user terminals on the basis of the received information. Then the base station determines the best course of action. In step 804A the base station determines that the direct communication is not providing sufficient quality, and thus, the base station decides to switch to the conventional communication mode, in which communication between two user terminals is performed via the base station. Alternatively, in step 804B, the base station decides to reallocate/redistribute the radio resources of the mobile communication network such that more or fewer radio resources are allocated to the direct communication link. The method ends in step 806.

FIG. 9 shows a method for applying the uplink signaling at the user terminal. The method begins in step 900. In step 902, the method comprises determining the information related to the traffic status and/or to the layer 2 at the user terminal. Further, in case one user terminal applies the uplink signaling, step 904 takes place, in which the user terminal collects the information from the other user terminal(s) involved in the direct communication link. However, step 904 may not be required in the case when each user terminal involved in the direct communication transmits the uplink signaling. Then, the method comprises transmitting the information in the uplink in step 906. The method ends in 908.

Even though the description is given in most parts for two user terminals involved in the direct communication link, it is straightforward to generalize the invention for a case where direct communication is established between a plurality of user terminals.

The invention offers several advantages. For example, it allows separating the link and signal quality based uplink reporting from the dataflow related QoS management as described. The link and signal quality based management of radio resources requires a lot of signaling due to the fact that channel quality information needs to be transmitted to the base station in order for the base station to make an informed decision related to the quality of the communication, whereas the latter, as described, needs only moderate signaling. Further, the link and signal quality based management of radio resources is generally performed initially in the establishment of the link and quite seldom afterwards. The data traffic and layer 2 related QoS management as described herein can be performed during on-going direct communication between at least two terminals. According to an embodiment, most of the automatic repeat request (ARQ) complexity can be performed in the conventional communication link instead of the direct communication link.

The techniques and methods described herein may be implemented by various means. For example, these techniques may be implemented in hardware (one or more devices), firmware (one or more devices), software (one or more modules), or combinations thereof. For a hardware implementation, the apparatus of FIG. 6 may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions) that perform the functions described herein. The software codes may be stored in a memory unit and executed by processors. The memory unit may be implemented within the processor or externally to the processor. In the latter case it can be communicatively coupled to the processor via various means, as is known in the art. Additionally, the components of the systems described herein may be rearranged and/or complimented by additional components in order to facilitate the achieving of the various aspects, etc., described with regard thereto, and they are not limited to the precise configurations set forth in the given figures, as will be appreciated by one skilled in the art.

Thus, according to an embodiment, the apparatus for performing the tasks of FIGS. 2 to 4 and 7 to 9 comprises processing means for applying the uplink signaling, in which information related to the traffic status of the direct communication link between at least two terminals is transmitted from a user terminal involved in the direct communication link to the base station.

Embodiments of the invention may be implemented as computer programs in the apparatus of FIG. 6 according to the embodiments of the invention. The computer programs comprise instructions for executing a computer process for improving the quality of service of the end-to-end communication between the at least two terminals. The computer program implemented in the apparatus may carry out, but is not limited to, the tasks related to FIGS. 2 to 4 and 7 to 9.

The computer program may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

Even though the invention has been described above with reference to an example according to the accompanying drawings, it is clear that the invention is not restricted thereto but can be modified in several ways within the scope of the appended claims. Further, it is clear to a person skilled in the art that the described embodiments may, but are not required to, be combined with other embodiments in various ways.

The invention claimed is:

1. A method comprising:
receiving, by a base station with uplink signaling in mobile communication from a user terminal of at least two user terminals, information related to traffic status of a direct communication link between the at least two user terminals being terminating points of the communication, wherein the mobile communication comprises a device-to-device communication between the at least two user terminals, wherein the uplink signaling is applied on a medium access control layer of the mobile communication, and wherein the information comprises a transmitter buffer status of the direct communication link between the at least two user terminals; and controlling, by the base station, quality of service of the device-to-device communication between the at least two user terminals by at least redistributing, by the base station, radio resources of the mobile communication over both a conventional link via the base station and the direct communication link based on the received information, comprising scheduling, by the base station, data transmissions of the at least two user terminals to cause switching back and forth between a first mode of alternately using radio bearers of each of the conventional link via the base station and the direct communication link for the device-to-device communication and a second mode of simultaneously using the radio bearers of both the conventional link via the base station and the direct communication link for the device-to-device communication.

2. The method of claim 1, wherein the direct communication link does not route data through the base station.

3. The method of claim 1, further comprising:
controlling the quality of service of the device-to-device communication between the at least two user terminals by more than one base station; and
communicating with at least one other base station in order to coordinate the quality of service of the device-to-device communication between the at least two terminals.

4. The method of claim 1, further comprising:
managing a virtual radio bearer database corresponding to the radio bearers applied in the direct communication between the at least two user terminals; and
updating the virtual radio bearer database based on the received information.

5. The method of claim 1, further comprising:
controlling re-transmissions of the direct communication link between the at least two user terminals such that the re-transmissions are performed through the conventional radio communication link via the base station.

6. The method of claim 1, wherein the information further comprises at least one of a sequence number of the last arrived data packet, a sequence number of the last transmitted data packet, a sequence number of the last in-sequence received data packet, a sequence numbers of at least one out-of-sequence received data packet, and a sequence numbers of at least one missing data packet on a radio bearer basis.

7. The method of claim 1, wherein the redistributing comprises redistributing, by the base station, the radio resources of the mobile communication from the direct communication link between the at least two user terminals based on at least a level of the transmitter buffer of the direct communication link exceeding a threshold value over a predetermined time limit.

8. An apparatus, comprising:
at least one processor; and
at least one memory including computer program code, where the at least one memory and the computer program code are configured with the at least one processor to cause the apparatus to at least:
apply uplink signaling in mobile communication, wherein the mobile communication comprises a device-to-device communication between at least two user terminals, wherein the uplink signaling is applied on a medium access control layer of the mobile communication, and wherein the signaling comprises information related to a traffic status of a direct communication link between the at least two user terminals being the terminating points of the mobile communication;
determine the information comprising a transmitter buffer status of a transmitting user terminal of the direct communication link between the at least two user terminals; and
transmit the information in the uplink signaling to a base station, thereby enabling the base station to control quality of service of the device-to-device communication between the at least two user terminals and to redistribute radio resources of the mobile communication based on the information; and
in response to the information, receiving scheduling from the base station causing switching back and forth between a first mode of alternately using radio bearers of each of a conventional link via the base station and the direct communication link for the device-to-device communication and a second mode of simultaneously using radio bearers of both the conventional link via the base station and the direct communication link to control the quality of service of the device-to-device communication.

9. The apparatus of claim 8, wherein the information is related to a packet data convergence protocol.

10. The apparatus of claim 8, wherein the uplink signaling is applied on a medium access control layer or on a radio resource control layer.

11. The apparatus of claim 8, wherein the at least one memory including the computer program code is configured with the at least one processor to cause the apparatus to:
transmit the information in the uplink signaling one of periodically, after a predetermined event, or on request.

12. The apparatus of claim 8, wherein the at least one memory including the computer program code is configured with the at least one processor to cause the apparatus to:
collect information from one user terminal involved in the direct communication link; and
transmit the collected information in the uplink.

13. The apparatus of claim 8, wherein the at least one memory including the computer program code is configured with the at least one processor to cause the apparatus to:
transmit the information simultaneously with another user terminal in a synchronized manner, or at a predefined time offset compared to another user terminal when more than one user terminal of the at least two user terminals transmits the information.

14. The apparatus of claim 8, wherein the at least one memory including the computer program code is configured with the at least one processor to cause the apparatus to:
manage a cache buffer beside a conventional layer 2 transmission-and-reception buffer at the user terminal in order to re-transmit at least one data packet already transmitted, as configured or if requested.

15. An apparatus, comprising:
at least one processor; and
at least one memory including the computer program code, where the at least one memory and the computer program code are configured with the at least one processor to cause the apparatus to:
receive, at a base station with uplink signaling in mobile communication from a user terminal of at least two user terminals, information related to traffic status of a direct communication link between the at least two user terminals being terminating points of the communication, wherein the mobile communication comprises a device-to-device communication between the at least two user terminals, wherein the uplink signaling is applied on a medium access control layer of the mobile communication, and wherein the information comprises a transmitter buffer status of the direct communication link between the at least two user terminals;

control quality of service of the device-to-device communication between the at least two user terminals based on the received information by at least redistributing radio resources of the mobile communication over both a conventional link via the base station and the direct communication link based on the received information, comprising scheduling, by the base station, data transmissions of the at least two user terminals to cause switching back and forth between a first mode of alternately using radio bearers of each of the conventional link via the base station and the direct communication link for the device-to-device communication and a second mode of simultaneously using the radio bearers of both the conventional link via the base station and the direct communication link for the device-to-device communication.

16. The apparatus of claim 15, wherein the direct communication link does not route data through the base station.

17. The apparatus of claim 15, wherein the at least one memory including the computer program code is configured with the at least one processor to cause the apparatus to:
control the quality of service of the communication between the at least two terminals by at least one other base station; and
communicate with at least one other base station in order to coordinate the quality of service of the device-to-device communication between the at least two terminals.

18. The apparatus of claim 15, wherein the at least one memory including the computer program code is configured with the at least one processor to cause the apparatus to:
manage a virtual radio bearer database corresponding to radio bearers applied in the direct communication between the at least two user terminals; and
update a virtual radio bearer database based on the received information.

19. The apparatus of claim 15, wherein the at least one memory including the computer program code is configured with the at least one processor to cause the apparatus to:
control re-transmissions of the direct communication link between the at least two user terminals such that the re-transmissions are performed through a conventional radio communication link via the base station.

20. A non-transitory computer-readable medium embodying a computer program product comprising program instructions which, when executed by at least one processor perform a method, comprising:
applying uplink signaling transmitted by a user equipment of at least two user equipment in mobile communication, wherein the uplink signaling is applied on a medium access control layer of the mobile communication, and wherein the signaling comprises information related to the traffic status of a direct communication link between the at least two user terminals being the terminating points of the communication, the method further comprising:
determining the information comprising a transmitter buffer status of the direct communication link between the at least two user equipment;
transmitting the information in the uplink signaling to a base station, thereby enabling the base station to control quality of service of device-to-device communication between the at least two user terminals and to redistribute radio resources of the mobile communication based on the information; and
in response to the information, receiving scheduling from the base station causing switching back and forth between a first mode of alternately using radio bearers of each of a conventional link via the base station and the direct communication link for the device-to-device communication and a second mode of simultaneously using radio bearers of both the conventional link via the base station and the direct communication link to control the quality of service of the device-to-device communication.

21. A method, comprising:
applying, by a user terminal of at least two user terminals, uplink signaling in mobile communication, wherein the uplink signaling is applied on a medium access control layer of the mobile communication, and wherein the signaling comprises information related to traffic status of a direct communication link between the at least two user terminals being terminating points of the communication, the method further comprising:
determining, by the user terminal, the information comprising a transmitter buffer status of the direct communication link between the at least two user terminals; and
transmitting, by the user terminal, the information in the uplink signaling to a base station, thereby enabling the base station to control quality of service of a device-to-device communication between the at least two user terminals and to redistribute radio resources of the mobile communication based on the information; and
in response to the information, receiving scheduling from the base station causing switching back and forth between a first mode of alternately using radio bearers of each of a conventional link via the base station and the direct communication link for the device-to-device communication and a second mode of simultaneously using the radio bearers of both the conventional link via the base station and the direct communication link to control the quality of service of the device-to-device communication.

22. The method of claim 21, wherein the information is related to a packet data convergence protocol.

23. The method of claim 21, wherein the transmitting the information in the uplink signaling is performed one of periodically, after a predetermined event, or on request.

24. The method of claim 21, further comprising:
collecting, at a user terminal, the information from one user terminal involved in the direct communication link; and
transmitting the collected information in the uplink.

25. The method of claim 21, further comprising:
transmitting the information simultaneously in a synchronized manner with other terminals, or at a predefined time offset compared to another user terminal when more than one user terminal transmits information related to traffic status of the direct communication link.

26. The method of claim 21, further comprising:
managing a cache buffer beside conventional layer 2 transmission-and-reception buffers at the user terminal in order to re-transmit at least one data packet already transmitted, as configured or if requested.

* * * * *